US008635352B2

(12) United States Patent
Shemesh

(10) Patent No.: US 8,635,352 B2
(45) Date of Patent: Jan. 21, 2014

(54) SYSTEM AND METHOD FOR SYMMETRIC RECEIVE-SIDE SCALING (RSS)

(75) Inventor: Oren Shemesh, Moshav Moledet (IL)

(73) Assignee: Qwilt, Inc., Wilmington, DE (US)

( * ) Notice: Subject to any disclaimer, the term of this patent is extended or adjusted under 35 U.S.C. 154(b) by 234 days.

(21) Appl. No.: 13/032,118

(22) Filed: Feb. 22, 2011

(65) Prior Publication Data

US 2012/0215932 A1   Aug. 23, 2012

(51) Int. Cl.
  *G06F 15/16*   (2006.01)

(52) U.S. Cl.
  USPC ........... 709/230; 370/471; 370/474; 370/392; 370/445; 370/352; 370/395.52; 370/389; 370/463; 370/466; 370/469; 455/466; 455/509; 375/260; 380/37; 380/28; 380/42; 380/44; 380/30; 380/277; 380/279; 380/282; 380/251; 713/150; 713/153; 713/161; 713/165; 713/171

(58) Field of Classification Search
  USPC ......................................................... 709/230
  See application file for complete search history.

(56) References Cited

U.S. PATENT DOCUMENTS

| | | | |
|---|---|---|---|
| 6,609,224 B1 * | 8/2003 | Jonsson ........................ 714/758 |
| 7,194,766 B2 * | 3/2007 | Noehring et al. ................ 726/13 |
| 7,548,513 B2 | 6/2009 | Tran |
| 7,715,428 B2 | 5/2010 | Basso et al. |
| 7,765,405 B2 * | 7/2010 | Pinkerton et al. .............. 713/181 |
| 7,826,614 B1 * | 11/2010 | Kaniz et al. ....................... 380/37 |
| 7,836,195 B2 | 11/2010 | Veal et al. |
| 8,102,880 B2 * | 1/2012 | Charpentier et al. ......... 370/474 |
| 8,160,089 B1 * | 4/2012 | Padiyar et al. ................. 370/445 |
| 2004/0141524 A1 * | 7/2004 | Lee et al. ........................ 370/469 |
| 2004/0246964 A1 * | 12/2004 | Grimminger et al. ......... 370/392 |
| 2005/0198509 A1 * | 9/2005 | Kaniyar et al. ................ 713/174 |
| 2005/0213603 A1 * | 9/2005 | Karighattam et al. ......... 370/463 |
| 2005/0238009 A1 * | 10/2005 | Bell ............................... 370/389 |
| 2006/0004782 A1 * | 1/2006 | Eldar ............................. 707/100 |
| 2007/0153770 A1 * | 7/2007 | Goyal et al. ................... 370/352 |
| 2008/0077792 A1 * | 3/2008 | Mann ............................. 713/160 |
| 2010/0083259 A1 | 4/2010 | Veal et al. |
| 2011/0019756 A1 * | 1/2011 | Chun et al. ..................... 375/260 |

(Continued)

OTHER PUBLICATIONS

Woo et al., "Scalable TCP Session Monitoring with Symmetric Receive-side Scaling", 2012.*

(Continued)

*Primary Examiner* — Tamara T Kyle
*Assistant Examiner* — Ondrej Vostal
(74) *Attorney, Agent, or Firm* — Sughrue Mion, PLLC

(57) ABSTRACT

A method for symmetric receive-side scaling (RSS) in a network device having an ingress side RRS router and an egress side RSS router and a plurality of queues for handling packets. The method comprises identifying an internet protocol (IP) version being used for the network. The transport layer headers (TLHs) existence status is identified. A secret key by each of the egress side RSS router and the ingress side RSS router is identified. The key is based on the identification of the IP version and the TLHs existence status. The secret key ensures that packets sent from a source to a destination and packets sent from the destination to the source are routed by the egress side RSS router and the ingress side RSS router to a common queue among the plurality of queues. The secret key is stored at a storage in the network device. The secret key is used by the ingress side RSS router and the egress side RSS router for routing packets.

9 Claims, 2 Drawing Sheets

(56) References Cited

U.S. PATENT DOCUMENTS

| | | | |
|---|---|---|---|
| 2011/0153861 A1* | 6/2011 | Chauhan | 709/232 |
| 2011/0154488 A1* | 6/2011 | Rajan et al. | 726/22 |
| 2011/0162062 A1* | 6/2011 | Kumar et al. | 726/15 |
| 2012/0033680 A1* | 2/2012 | Gopinath et al. | 370/412 |
| 2012/0036244 A1* | 2/2012 | Ramachandra et al. | 709/223 |
| 2012/0087309 A1* | 4/2012 | Charpentier et al. | 370/328 |
| 2012/0136999 A1* | 5/2012 | Roitshtein et al. | 709/225 |

OTHER PUBLICATIONS

Microsoft Corporation, "Receive-Side Scaling Enhancements in Windows Server 2008", Nov. 2008.*

Stallings, "IPv6: The New Internet Protocol", 1996.*

Metzger et al., "IP Authentication using Keyed MD5", 1995.*

Postel, "DARPA Internet Program Protocol Specification", RFC 791, 1991.*

Conta et al., "Internet Control Message Protocol (ICMPv-6) for the Internet Protocol Version 6 (IPv6) Specification", RFC 1885, 1995.*

Nichols et al., "Definition of the Differentiated Services Field (DS Field) in the IPv4 and IPv6 Headers", RFC 2474, 1998.*

Kent et al., "Security Architecture for the Internet Protocol", RFC 2401, 1998.*

Deering et al., "Internet Protocol, Version 6 (IPv6) Specification", RFC 1883, 1995.*

Kent et al., "IP Authentication Header", RFC 2402, 1998.*

Microsoft Corporation, "Receive-Side Scaling Enhancements in Windows Server 2008", 2008.*

\* cited by examiner

SYSTEM AND METHOD FOR SYMMETRIC RECEIVE-SIDE SCALING (RSS)

TECHNICAL FIELD

The disclosed teachings relate to directing of packets in a network device to one of a plurality of processing queues, and more specifically to a network device operating in a receive-side scaling architecture.

BACKGROUND

Receive-Side Scaling (RSS) was introduced by Microsoft® in order to resolve the single-processor bottleneck. It allows the receive side network load from a network adapter to be shared across many processors, thereby enabling the scaling of the packet receive-processing. This is particularly beneficial with the more modern multi-core processor architectures, whether integrated or distributed. The features of RSS are described in a paper published by Microsoft® in November 2008, entitled "Receive-Side Scaling Enhancements in Windows™ Server 2008", hereinafter referred to as the Specification, and included herein by reference. According to RSS the hardware unit is supposed to put each packet through a hash function, and the result determines, using a lookup table, which RX queue handles the packet. The hash function is fixed and fully described by Microsoft®, and it further includes a 'secret key'. The secret key is a number chosen at random, i.e., different at each boot of the hardware. This makes the hash result unpredictable to an external entity. This secrecy is useful because, otherwise, if the hash is known to an external entity, that external entity could maliciously craft multiple different packets that are targeted to arrive at the same queue, thus flooding a single queue instead of the packets being spread over all available queues.

This RSS technique is good for end-machines, which only receive packets coming from the other side of the connection. However, when a network entity is considered, that receives both sides of a connection, e.g., a firewall, also referred to as a bump-in-the-network device, a problem arises as there is no guarantee under the RSS solution that packets that have the same tuple will be mapped to the same queue, regardless of the direction the packets came from. FIG. 1 shows a plurality of nodes, N1 110-1, N2 110-2 and N3 110-3 on one side of a network device 120 and a plurality of nodes, Ni 110-i, Nj 110-j and Nk 110-k, on the other side of the network device 120. The network device 120 comprises a RSS router 122 to which the nodes N1 110-1, N2 110-2 and N3 110-3 are connected to. The network device 120 further comprises a RSS router 126 to which the nodes Ni 100-i, Nj 110-j and Nk 110-k are connected to. Each of the RSS router 122 and RSS router 126 is implemented according to the Specification. Each of the RSS routers 122 and 126 may be an egress or ingress router as may be applicable and dynamically changing. The network device 120 further comprises three queues, Q1 124-1, Q2 124-2 and Q3 124-3. In the case, where node N1 is to communicate with node Ni, node N2 with node Nj and node N3 with node Nk, packets will be moving through the network device 120. However, due to the different operation of the RSS router 122 and the RSS router 126, though the same tuple value is provided, the hash will result in a different queue allocation. For example, a packet traveling from node N1 may be routed to Q1 while the response packet from node Ni may be routed to Q2, and so on and so forth.

This issue is further described in US patent application 20080077792, entitled "Bidirectional Receive Side Scaling" by Eric K. Mann. Mann solves the problem of mapping the tuples of both sides of a connection to the same RX queue by changing the hash function, and proposing two methods for creating a hash function that yields the same output both for (A1,A2) and for (A2,A1), for any pair of network addresses A1 and A2 that correspond, for example to N1 and Ni respectively. Mann refers to this as a commutative hash function. However, the commercially available network cards have been manufactured to meet the Microsoft® RSS specification, and most of them contain only the hash function specified by Microsoft®. While the RSS specification allows the offering of additional hash functions, in practice it is likely that existing commodity hardware supports only the Microsoft® hash function.

It would be advantageous to overcome the deficiencies of the prior art, and especially the asymmetric behavior of the RSS technique when operating a network device that is a bump-in-the-network device. It would be further advantageous if the solution avoids security breaches by not exposing the secret key. It would be further advantageous to allow the implementation on readily available hardware and further preferably without the need to change the hash functions embedded therein.

SUMMARY

To realize some of the advantages described above, there is provided a method for symmetric receive-side scaling (RSS) in a network device having an ingress side RRS router and an egress side RSS router and a plurality of queues for handling packets. The method comprises identifying an internet protocol (IP) version being used for the network. The transport layer headers (TLHs) existence status is identified. A secret key by each of the egress side RSS router and the ingress side RSS router is identified. The key is based on the identification of the IP version and the TLHs existence status. The secret key ensures that packets sent from a source to a destination and packets sent from the destination to the source are routed by the egress side RSS router and the ingress side RSS router to a common queue among the plurality of queues. The secret key is stored at a storage in the network device. The secret key is used by the ingress side RSS router and the egress side RSS router for routing packets.

In a specific enhancement, the IP versions is IPv4 or IPv6.

More specifically, the TLHs existence status is one of existent and nonexistent.

More specifically, the secret key is generated based on a seed.

More specifically, the generation of the secret key further comprises choosing the seed to be a random 32-bit number and repeating it four times thereby creating a 128-bit secret key for a case of IPv4 and nonexistent status of the TLHs. For a case of IPv4 and existent status of the TLHs choosing the seed to be a random 16-bit number and repeating it eight times thereby creating a 128-bit secret key. For a case of IPv6 and nonexistent status of the TLHs by choosing the seed to be a random 32-bit number and repeating it ten times thereby creating a 320-bit secret key. For a case of IPv6 and existent status of the TLHs choosing the seed to be a random 16-bit number and repeating it twenty times thereby creating a 320-bit secret key.

More specifically, the method further comprises initializing the network device periodically by generation of a new seed.

More specifically, the TLHs correspond to at least one of: transport control protocol (TCP), User Datagram Protocol (UDP).

Another aspect of the disclosed teachings is an apparatus operative as a symmetric receive-side scaling (RSS) network device, the apparatus comprises a plurality of queues for handling network packets. An ingress RSS router is connected to the plurality of queues, the ingress RSS router routing packets to a queue from the plurality of queues using a secret key. An egress RSS router is connected to the plurality of queues, the egress RSS router routing packets to a queue from the plurality of queues using the secret key. A generator generates the secret key based on identification of an internet protocol (IP) version and existence status of transport layer headers (TLHs). The secret key ensures that packets sent from a source to a destination and packets sent from the destination to the source are routed by the egress side RSS router and the ingress side RSS router to a common queue from the plurality of queues.

Another aspect of the disclosed teachings is a computer software product embodied in a tangible and non-transitory medium readable by a computing device that contains a series of instructions that when executed by the computing device executes a method for symmetric receive-side scaling (RSS) in a network device having an ingress side RRS router and an egress side RSS router and a plurality of queues for handling packets. The instructions are required to implement the above techniques on the computing device.

BRIEF DESCRIPTION OF THE DRAWINGS

The above discussed advantages of the disclosed teachings will become more apparent by describing in detail some exemplary implementations thereof with reference to the attached drawings in which.

DETAILED DESCRIPTION OF THE INVENTION

A solution that resolves the issues of receive-side scaling (RSS) is provided. The network device that receives packets from both sides of a network directs the packets for processing in one of a plurality of queues for processing such that packets having the same tuple are assured to be directed to the same queue regardless of their direction flow. This is done by creating a symmetric RSS architecture.

Figure 1:
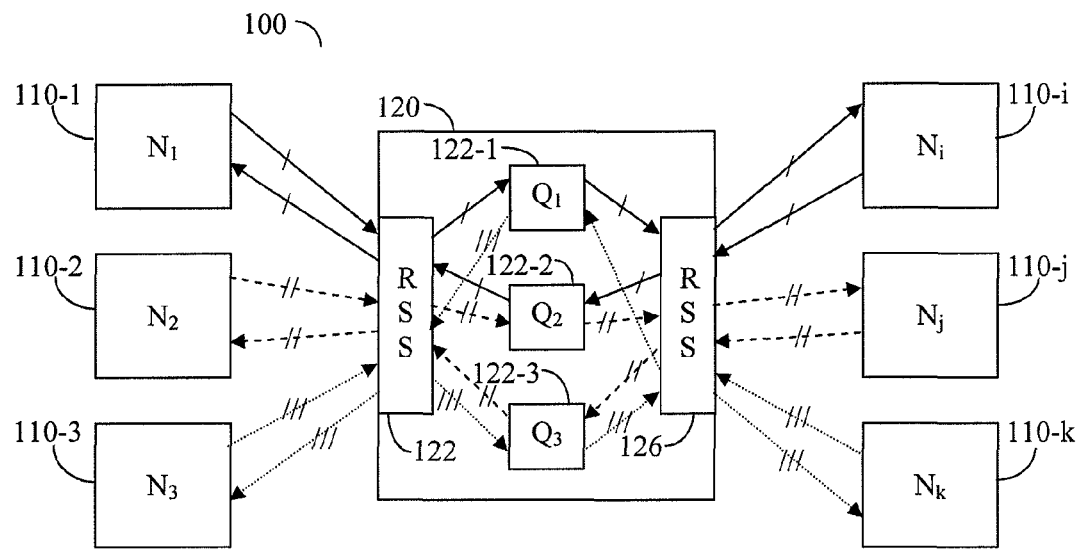
FIG. 1—is a system with a network device handling packets received from nodes on two sides of the network in accordance with the prior art FIG. 2—is a system with a network device handling packets received from nodes on two sides of the network in accordance with the principles of the invention FIG. 3—is a flowchart describing the generation of a secret key in accordance with the principles of the invention
Figure 2:
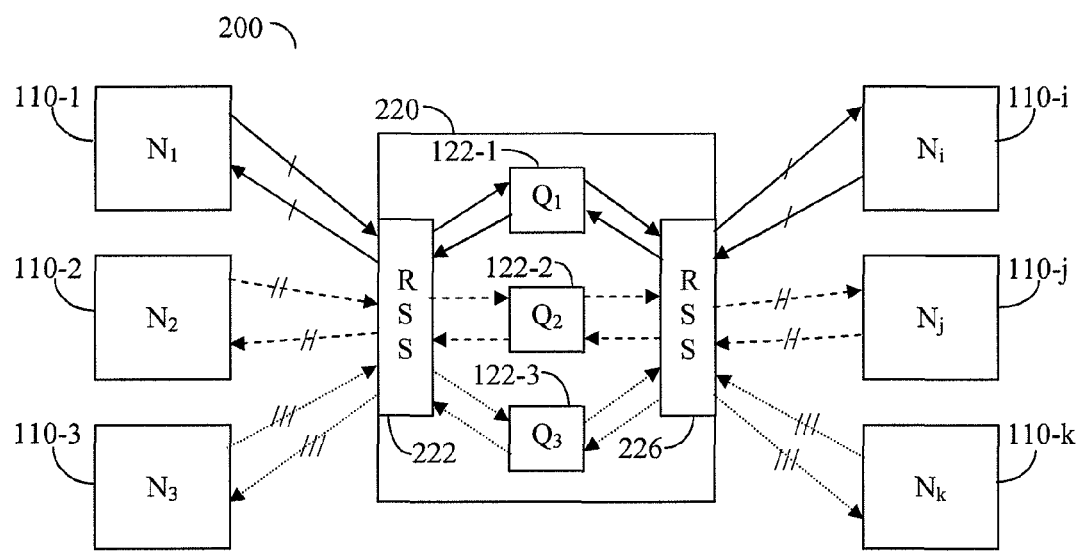

FIG. 2 depicts an exemplary and non-limiting schematic block diagram of a system 200 handling packets received from nodes on two sides of the network in accordance with the principles of the invention. A plurality of nodes, N1 110-1, N2 110-2 and N3 110-3 on one side of a network device 220 and a plurality of nodes, Ni 110-$i$, Nj 110-$j$ and Nk 110-$k$, on the other side of the network device 220. The network device 220 comprises a RSS router 222 to which the nodes N1 110-1, N2 110-2 and N3 110-3 are connected to. The network device 220 further comprises a RSS router 226 to which the nodes Ni 100-$i$, Nj 110-$j$ and Nk 110-$k$ are connected to. Each of the RSS router 222 and RSS router 226 is implemented, according to the principles of the invention, for a symmetric RSS router and as further explained herein below. The network device 220 further comprises three queues, Q1 124-1, Q2 124-2 and Q3 124-3. In the case where node N1 is to communicate with node Ni, node N2 with node Nj and node N3 with node Nk, packets will be moving through the network device 220. Due to the symmetric RSS provided by the RSS router 222 and the RSS router 226 the same tuple value will result in the same queue allocation. For example, a packet traveling from node N1 that is routed to Q1 will also have the response packet from node Ni routed to Q1, because the symmetric RSS ensure that the same has is generated for the same tuple.

According to the invention a creation of a proper secret key that yields a symmetrical RSS generated from the Microsoft hash function is possible. The creation depends on the specific mode used by the hash function and is described in the Specification. One parameter is the version of the internet protocol (IP) which can be version 4 or 6, and generally referred to as IPv4 and IPv6 respectively. The other parameter is the existence or lack thereof of Transport Layer Headers (TLHs) of, for example, a Transmission Control Protocol (TCP) or a User Datagram Protocol (UDP). hence, there are four different possible cases for which an appropriate secret key is to be created. For IPv4 without TLHs a choice of a random 32-bit number is made, which is then repeated four times to create a 128-bit secret key. For IPv4 with TLHs a choice of a random 16-bit number is made, which is then repeated eight times to create a 128-bit secret key. For IPv6 without TLHs a choice of a random 32-bit number is made, which is then repeated ten times to create a 320-bit secret key. For IPv6 with TLHs a choice of a random 16-bit number is made, which is then repeated twenty times to create a 320-bit secret key. While the secret key is shorter than the regular key that would be otherwise generated it is still advantageous over the prior art because of the assurance the proper routing of packets as discussed above. In order to overcome malicious attempts to block the queues the network device 220 may periodically regenerate a random number and then the secret key for the network device 220 thereby significantly reducing the risk.

Figure 3:
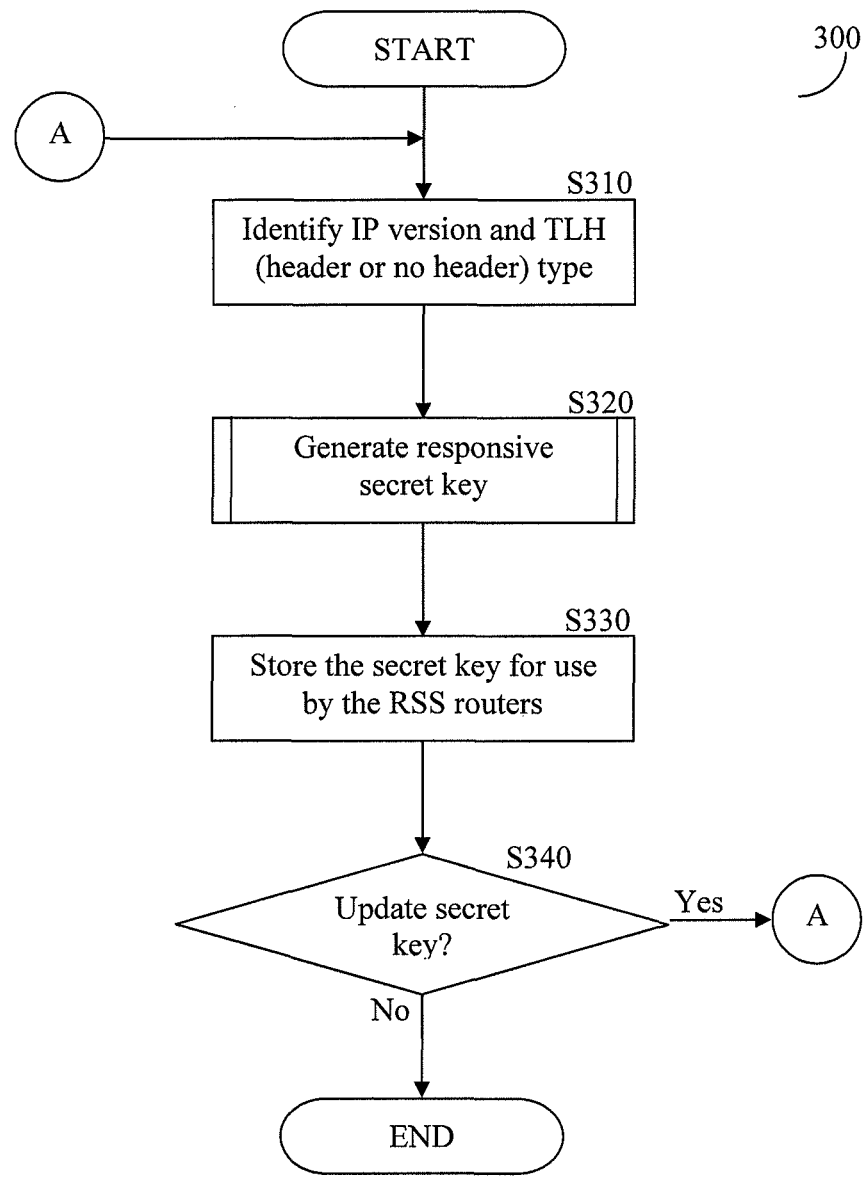

FIG. 3 depicts of an exemplary and non-limiting flowchart 300 describing the generation of a secret key in accordance with the principles of the invention. In S310 the type of protocols used, i.e., IPv4 or IPv6, and with or without TLHs, are identified. In S320 a secret key is generated based on the specific identification made in S310 and as explained hereinabove. In S330 the secret key is stored for use by the RSS routers. In S340 it is checked if it is necessary to update periodically the random seed and if so execution continues with S310; otherwise, execution terminates.

The principles of the invention are implemented as hardware, firmware, software, or any combination thereof. Moreover, the software is preferably implemented as an application program tangibly embodied on a program storage unit or non-transitory computer readable medium or a non-transitory machine-readable storage medium that can be in a form of a digital circuit, an analogy circuit, a magnetic medium, or combination thereof. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

I claim:

1. A method for symmetric receive-side scaling (RSS) in a network device having an ingress side RRS router and an egress side RSS router and a plurality of queues for handling packets, the method comprising:
   identifying an internet protocol (IP) version being used for the network, wherein the IP versions is IPv4 or IPv6;
   identifying transport layer headers (TLHs) existence status, wherein the TLHs existence status is one of existent and nonexistent;
   generating a secret key by each of the egress side RSS router and the ingress side RSS router, the key being based on the identification of the IP version and the TLHs existence status, the secret key ensuring that packets sent from a source to a destination and packets sent from the destination to the source are routed by the egress side RSS router and the ingress side RSS router to a common queue among the plurality of queues, wherein the secret key is generated based on a seed, and wherein generation of the secret key further comprises: for a case of IPv4 and nonexistent status of the TLHs choosing the seed to be a random 32-bit number and repeating it four times thereby creating a 128-bit secret key; for a case of IPv4 and existent status of the TLHs choosing the seed to be a random 16-bit number and repeating it eight times thereby creating a 128-bit secret key; for a case of IPv6 and nonexistent status of the TLHs by choosing the seed to be a random 32-bit number and repeating it ten times thereby creating a 320-bit secret key; and, for a case of IPv6 and existent status of the TLHs choosing the seed to be a random 16-bit number and repeating it twenty times thereby creating a 320-bit secret key; and
   storing the secret key at a storage in the network device, the secret key being used by the ingress side RSS router and the egress side RSS router for routing packets.

2. The method of claim 1, further comprising:
   initializing the network device periodically by generation of a new seed.

3. The method of claim 1, wherein the TLHs correspond to at least one of: transport control protocol (TCP), User Datagram Protocol (UDP).

4. An apparatus operative as a symmetric receive-side scaling (RSS) network device, the apparatus comprising:
   a plurality of queues for handling network packets;
   an ingress RSS router connected to the plurality of queues, the ingress RSS router routing packets to a queue from the plurality of queues using a secret key;
   an egress RSS router connected to the plurality of queues, the egress RSS router routing packets to a queue from the plurality of queues using the secret key; and
   a generator that generates the secret key based on identification of an internet protocol (IP) version, wherein the IP version is IPv4 or IPv6, and existence status of transport layer headers (TLHs), wherein the TLHs existence status is one of: existent, nonexistent, the secret key ensuring that packets sent from a source to a destination and packets sent from the destination to the source are routed by the egress side RSS router and the ingress side RSS router to a common queue from the plurality of queues, wherein the secret key is generated based on a seed and wherein the secret key comprises: a random 32-bit number as the seed that is repeated four times to create a 128-bit secret key for a case of IPv4 and nonexistent status of the TLHs; a random 16-bit number as the seed that is repeated eight times to create a 128-bit secret key for a case of IPv4 and existent status of the TLHs; a random 32-bit number as the seed that is repeated ten times to create a 320-bit secret key for a case of IPv6 and nonexistent status of the TLHs; and, a random 16-bit number as the seed that is repeated twenty times to create a 320-bit secret key for a case of IPv6 and existent status of the TLHs.

5. The apparatus of claim 4, wherein the network device is initialized periodically to generate a new seed.

6. The apparatus of claim 4, wherein the TLHs correspond to at least one of: transport control protocol (TCP), User Datagram Protocol (UDP).

7. A computer software product embodied in a tangible and non-transitory medium readable by a computing device that contains a series of instructions that when executed by the computing device executes a method for symmetric receive-side scaling (RSS) in a network device having an ingress side RRS router and an egress side RSS router and a plurality of queues for handling packets, the method comprising:
   identifying an internet protocol (IP) version, wherein the IP versions is IPv4 or IPv6;
   identifying transport layer headers (TLHs) existence status, wherein the TLHs existence status is one of: existent, nonexistent;
   generating a secret key by each of the egress side RSS router and the ingress side RSS router, the key being based on the identification of the IP version and the TLHs existence status, the secret key ensuring that packets sent from a source to a destination and packets sent from the destination to the source are routed by the egress side RSS router and the ingress side RSS router to a common queue among the plurality of queues, wherein the secret key is generated responsive of a seed, and wherein the generation of the secret key comprises: a random 32-bit number as the seed that is repeated four times to create a 128-bit secret key for a case of IPv4 and nonexistent status of the TLHs; a random 16-bit number as the seed that is repeated eight times to create a 128-bit secret key for a case of IPv4 and existent status of the TLHs; a random 32-bit number as the seed that is repeated ten times to create a 320-bit secret key for a case of IPv6 and nonexistent status of the TLHs; and, a random 16-bit number as the seed that is repeated twenty times to create a 320-bit secret key for a case of IPv6 and existent status of the TLHs; and
   storing the secret key at a storage in the network device, the secret key being used by the ingress side RSS router and the egress side RSS router for routing packets.

8. The computer software product of claim 7, further comprising:
   initializing periodically the network device by generation of a new seed.

9. The computer software product of claim 7, wherein the TLHs correspond to at least one of: transport control protocol (TCP), User Datagram Protocol (UDP).

* * * * *